(12) United States Patent
Uezono

(10) Patent No.: US 8,935,178 B2
(45) Date of Patent: Jan. 13, 2015

(54) ORDERING APPARATUS AND METHOD

(75) Inventor: Tomomasa Uezono, Hyogo-ken (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 225 days.

(21) Appl. No.: 13/488,862

(22) Filed: Jun. 5, 2012

(65) Prior Publication Data

US 2012/0330770 A1    Dec. 27, 2012

(30) Foreign Application Priority Data

Jun. 22, 2011    (JP) .................................. 2011-138574

(51) Int. Cl.
| | | |
|---|---|---|
| G07G 1/10 | (2006.01) | |
| G06Q 10/00 | (2012.01) | |
| G06Q 20/20 | (2012.01) | |
| G06Q 20/00 | (2012.01) | |
| G06Q 30/06 | (2012.01) | |

(52) U.S. Cl.
CPC ................ G06Q 10/00 (2013.01); G06Q 20/20 (2013.01); G06Q 20/00 (2013.01); G06Q 30/06 (2013.01)

USPC ................ 705/25; 705/22; 705/26.8; 705/29

(58) Field of Classification Search
CPC ............................. G06Q 20/203; G06Q 20/20
USPC ....................................... 705/22, 26.8, 29, 25
See application file for complete search history.

(56) References Cited

U.S. PATENT DOCUMENTS

2004/0193496 A1*    9/2004    Hirota .............................. 705/15

FOREIGN PATENT DOCUMENTS

| JP | 2002342438 A | * 11/2002 |
|---|---|---|
| JP | 2006-004143 | 1/2006 |

* cited by examiner

*Primary Examiner* — Florian Zeender
*Assistant Examiner* — Hunter Wilder
(74) *Attorney, Agent, or Firm* — Amin, Turocy & Watson, LLP

(57) ABSTRACT

An ordering apparatus stores an order quantity, moreover, generates the order data for each ordered commodity by associating a plurality of the commodity identifiers which is accepted the input with the order quantities which is stored, during the period from the moment that the input of the commodity identifier is accepted to the moment that is determined that the input acceptance is terminated.

9 Claims, 4 Drawing Sheets

Figure 6:
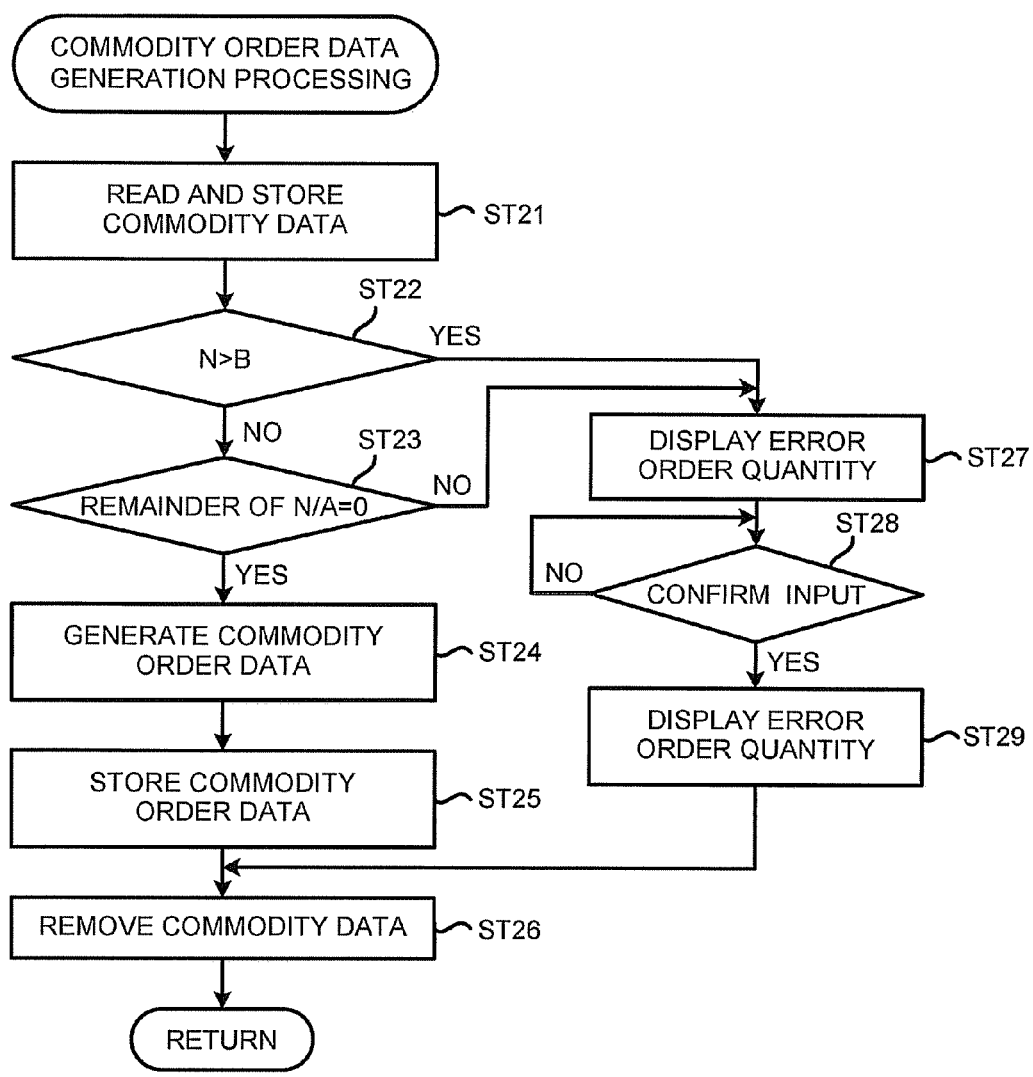

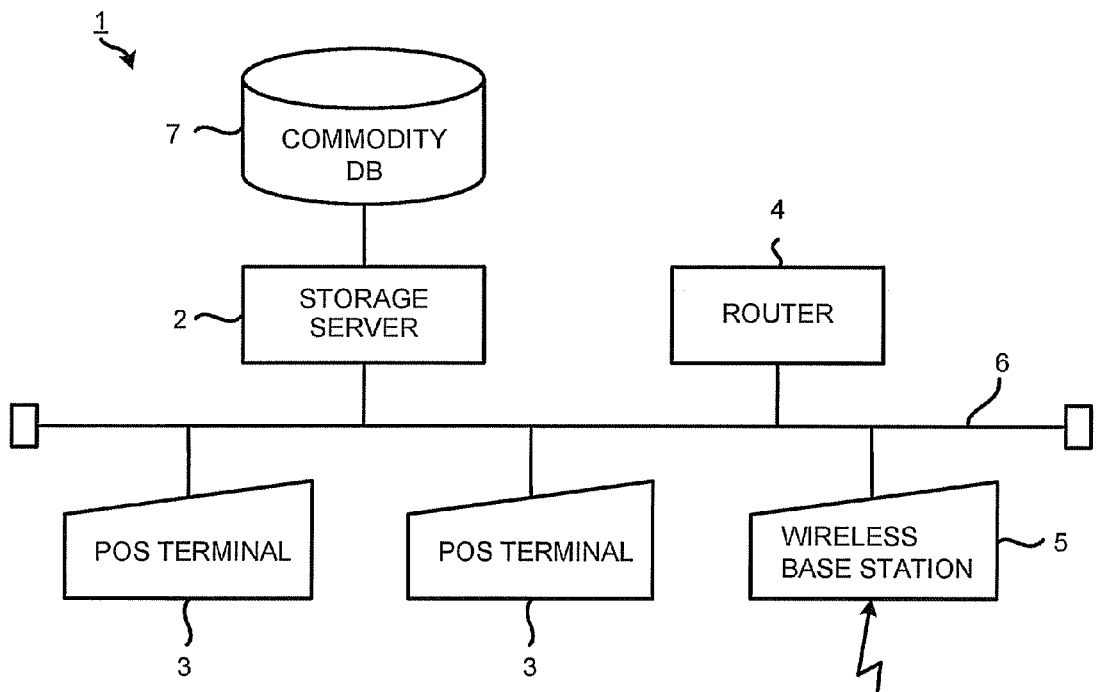
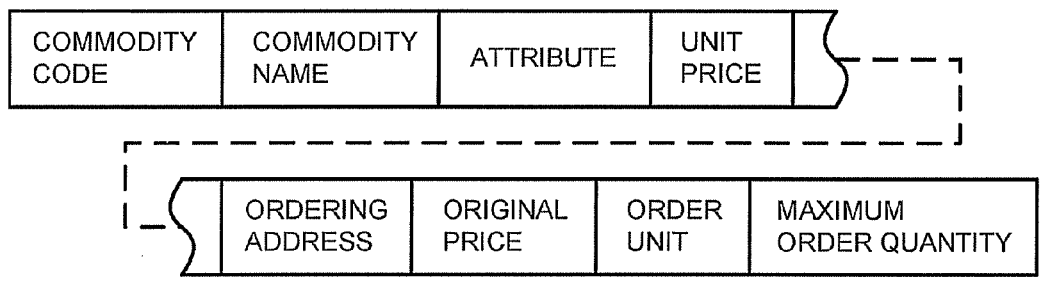

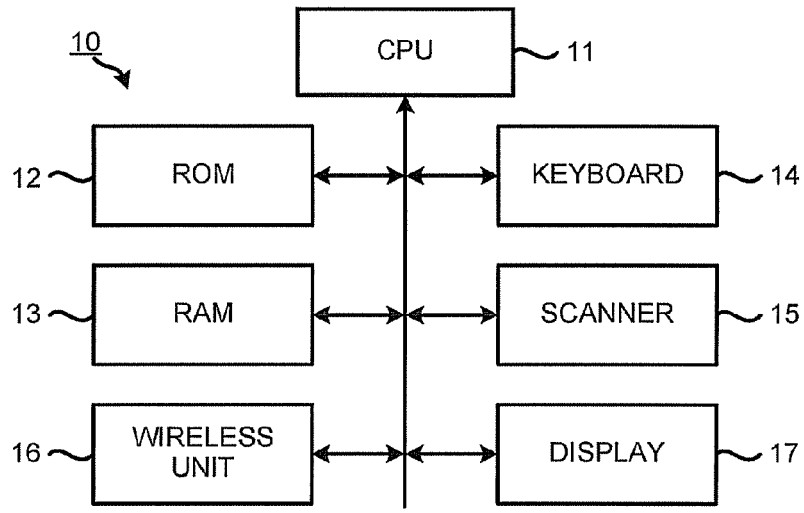

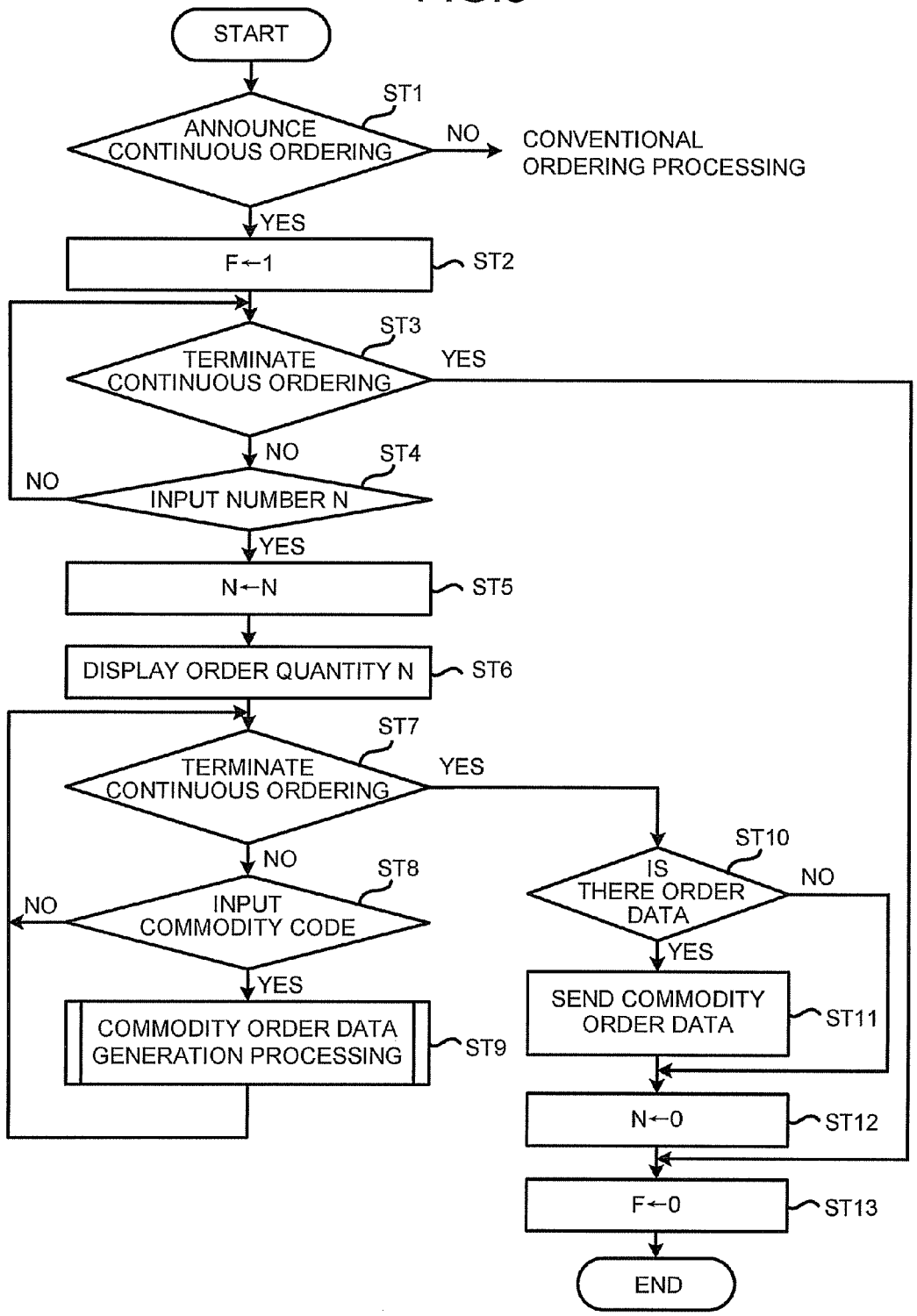

ORDERING APPARATUS AND METHOD

CROSS-REFERENCE TO RELATED APPLICATION

This application is based upon and claims the benefit of priority from Japanese Patent Application No. 2011-138574, filed Jun. 22, 2011, the entire contents of which are incorporated herein by reference.

FIELD

Embodiments described herein relate to an ordering apparatus supporting a commodity ordering service.

BACKGROUND

A portable ordering terminal is used in a supermarket or convenience store as an ordering apparatus to support a commodity ordering service. The ordering terminal comprises: a first input device configured to input a commodity identifier (for example, a barcode) for specifying an ordered commodity; and a second input device configured to input an order quantity; and a communication unit configured to send commodity order data. Moreover, the commodity identifier input by the first input device is associated with the order quantity by the first second device to generate commodity order data, which is then sent to an external server through the communication unit.

In the use of such an ordering apparatus, as a commodity identifier and an order quantity should be input for each ordered commodity, commodity identifiers and order quantities are alternatively and repeatedly input when a variety of kinds of commodities are ordered, which is cumbersome to the operator. Moreover, an error order quantity input occurs occasionally in inputting an order quantity for each kind of commodity.

BRIEF DESCRIPTION OF THE DRAWINGS

FIG. 1 is a diagram showing the whole structure of a shop system using the ordering terminal described in an embodiment;

FIG. 2 is a schematic diagram showing the structure of the commodity data stored in the commodity database described in the embodiment;

FIG. 3 is a block diagram showing the main devices of the ordering terminal described in the embodiment;

FIG. 4 is a diagram illustrating a primary storing area formed in the RAM of the POS terminal described in the embodiment;

FIG. 5 is a flow chart showing the main information processing executed by the CPU of the POS terminal described in accordance with an ordering program in the embodiment;

FIG. 6 is a flow chart showing the specific processing sequence of the commodity order data generation processing shown in FIG. 5.

DETAILED DESCRIPTION

According to one embodiment, an ordering apparatus comprises an order quantity storing section, an ordered commodity accepting section, a termination determination section and an order data generation section. The order quantity storing section configured to store an order quantity. The ordered commodity accepting section configured to accept the input of a commodity identifier specifying an ordered commodity.

The termination determination section configured to determine the termination of the input acceptation of the commodity identifier. The order data generation section configured to generate the order data for each ordered commodity by associating a plurality of the commodity identifiers which is accepted the input by the ordered commodity accepting section with the order quantities stored in the order quantity storing section, during the period from the moment that the input of the commodity identifier is accepted to the moment that the termination determination section determines that the input acceptation is terminated.

An embodiment of the ordering apparatus supporting a commodity ordering service is described below with reference to accompanying drawings. Moreover, in this embodiment, an ordering program is installed on an information terminal serving as a portable computer device to enable the information terminal to function as an ordering apparatus, thereby enabling the information terminal to function as an ordering terminal 10.

FIG. 1 is a diagram showing the whole structure of a shop system using the ordering terminal 10 described in this embodiment. In addition to the ordering terminal 10, the system further comprises a storage server 2, a plurality of POS (Point of Sales) terminals 3, a router 4 and a wireless base station 5. Moreover, the storage server 2, the POS terminals 3, the router 4 and the wireless base station 5 are connected with each other through an LAN (Local Area Network) 6.

The storage server 2 manages a commodity database 7 for storing commodity data. The POS terminals 3 register the sales data of customer-purchased commodities based on the data managed by the commodity database 7. The commodity sales data registered in each POS terminal 3 is sent to the storage server 2 via the LAN 6. The storage server 2 gathers the commodity sales data collected from each POS terminal 3 and exports the sales data of the whole shop.

The router 4 connects the LAN 6 with an external network (not shown) such as the Internet. The wireless base station 5 is wirelessly connected with the ordering terminal 10 serving as a mobile station. The external network connected through the router 4 is at least connected with a local server responsible for accepting the commodity order generated in each shop.

FIG. 2 is a schematic diagram showing the structure of the commodity data stored in the commodity database 7. As shown in FIG. 2, commodity data at least includes a commodity code, a commodity name, attributes, a unit price, an ordering address information, an original price, an order unit and a maximum order quantity. The commodity code serves as a commodity identifier for specifying a commodity.

The minimum order unit refers to the minimum allowable order quantity in an order. For example, if the minimum unit of ordering is a dozen, for the commodity is that the maximum number of the allowable order is 10 dozens, the maximum order quantity is 10. In the same way, if the minimum unit of ordering is a case containing 10 pieces, for the commodity is that the maximum number of the allowable order is 20 cases, the maximum order quantity is 20. In this case, the unit of ordering and the maximum order quantity are a condition for determining whether or not the order quantity is reasonable.

FIG. 3 is a block diagram showing the main devices of the ordering terminal 10. The ordering terminal 10 comprises a CPU 11 (Central Processing Unit) which constitutes the main body of a computer, an ROM 12 (Read Only Memory) and an RAM (Random Access Memory) 13 which constitute a primary memory section, a keyboard 14 serving as a first input device, a scanner 15 serving as a second input device, a wireless unit 16 serving as a communication section and a display 17 serving as a display device.

In addition to a numeric keypad for inputting an order quantity, the keyboard 14 further comprises an announcement key for the announcement of a continuous order mode, a release key for releasing the continuous order mode and a confirm key for a confirming an error.

In a normal order mode, the input of a commodity identifier for specifying an ordered commodity and an order quantity is accepted, and every time a commodity identifier and an order quantity are input, the input commodity identifier and order quantity are associated with each other to generate commodity order data to realize the order for a commodity. On the contrary, in the continuous order mode, the input of order quantities is accepted before the input of the commodity identifiers of the ordered commodities, and every time a commodity identifier is input, the input commodity identifier is associated with pre-input order quantity to generate commodity order data to realize the order for a commodity. Therefore, the normal order mode is effective when each commodity is ordered in different quantity, while the continuous order mode is effective when different commodities are ordered together in the same quantity.

The scanner 15 reads a commodity code from the information media (e.g. barcode, RFID label) added on a commodity. The wireless unit 16 is responsible for the wireless communication with the wireless base station 5. The display 17 displays the commodity name and the order quantity of the commodity specified by the commodity code read by the scanner 15.

As shown in FIG. 4, in the RAM 13 of the ordering terminal 10, there is formed a buffer area 21 (hereinafter referred to as ordering buffer) in which commodity order data is temporarily stored which at least contains a commodity code, a commodity code, ordering address information, an original price and an order quantity, a flag area 22 where a continuous order flag F 22 exists, a storage area 23 (order quantity storing section: hereinafter referred to as order quantity storage) for storing an input order quantity N, and a storage area 24 (hereinafter referred to as ordered commodity storage) for storing commodity data which at least contains a commodity code, a commodity name, ordering address information, an original price, an order unit A and the maximum order quantity B.

Then, the CPU 11 carries out the information processing the sequence of which is shown in FIG. 5 and FIG. 6 according to an ordering program stored in the ROM 12.

That is, after the ordering program is started, the CPU 11 first determines whether or not there is an announcement on the continuous order mode (ST1), the CPU 11 considering there is an announcement on the continuous order mode if the announcement key on the keyboard 14 is pressed down. The CPU 11 controls each other device in the way used in the normal order mode if the announcement key is not pressed down If there is an announcement on a continuous order mode (ST1: Yes), the CPU 11 sets the continuous order flag in the flag area 22 to be 1 (ST2). Then, the CPU 11 announces the termination of the continuous order mode (ST3) or waits for the input of a number N through the numeric keypad of the keyboard 14 (ST4: order quantity accepting section).

If there is no announcement on the termination that the continuous order mode is terminated (ST3: No) and a number N is input (ST4: Yes), the CPU 11 writes the number N into the order quantity storage 23 as an input order quantity (ST5: order quantity update section). Moreover, the CPU 11 displays the input order quantity N on the display 17 (ST6).

Next, the CPU 11 announces the termination of the continuous order mode (ST7: termination determination section) or waits for the input of a commodity code serving as a commodity identifier (ST8: ordered commodity accepting section). If a commodity code is input through the scanner 15 (ST8: Yes), then the CPU 11 carries out the commodity order data generation processing shown in FIG. 6 (ST9).

First, the CPU 11 edits a commodity data query instruction containing the input commodity code and wirelessly sends the commodity data query instruction to the storage server 2. After receiving the instruction, the storage server 2 retrieves a commodity database 7 using the commodity code contained in the instruction, exports matched commodity data and sends the exported commodity data to the ordering terminal 10 of the instruction sending source, thus, the CPU 11 extracts a commodity code, a commodity name, ordering address information, an original price, an order unit A and a maximum order quantity B from the received commodity data and stores the extracted data in the ordered commodity storage 24 (ST21). Then, the CPU 11 displays at least the commodity name on the display 17.

Next, the CPU 11 compares the input order quantity N stored in the order quantity storage 23 with the maximum order quantity B stored in the ordered commodity storage 24 (ST22: condition determination section). Here, if the input order quantity N is greater than the maximum order quantity B, then the condition for the maximum order quantity allowed in an order is not satisfied, otherwise, the condition is satisfied.

In the case where the input order quantity N is not greater than the maximum order quantity B (ST22: No), the CPU 11 divides the input order quantity N by the order unit A and determines whether or not the remainder of the resulting quotient is 0 (ST23: condition determination section). Here, the condition for the minimum order quantity allowed in an order is not satisfied if a remainder is generated as the input order quantity N is not integer times of the order unit A, or satisfied if the remainder is 0, that is, the input order quantity N is integer times of the order unit A.

When the remainder of the quotient resulting from the division of the input order quantity N by the order quantity A is 0 (ST23: Yes), the CPU 11 associates the commodity code, commodity name, ordering address information and original price stored in the ordered commodity storage 24 with the order quantity N stored in the order quantity storage 23 (ST24: order data generation section) to generate commodity order data, and then stored the generated commodity order data in the order buffer 21 (ST25).

Sequentially, the CPU 11 removes the commodity data stored in the ordered commodity storage 24 (ST25) and returns to execute Act ST7 or ST8 to be in a standby state to wait for an input. At this time, the he CPU 11 removes the displayed commodity name.

On the contrary, if the order condition is not satisfied, that is, the input order quantity N is greater than the maximum order quantity B (ST 22: Yes), or the remainder of the quotient resulting from the division of the input order quantity N by the order unit A is not 0 (ST23: No), the CPU 11 displays an alarm 'error order quantity' on the display 17 to warn the operator (ST27).

Next, the CPU 11 waits for the input of the confirm key (ST28) and clears the alarm when the confirm key is input (ST29). Besides, the CPU 11 also removes the commodity data stored in the ordered commodity storage 24 (ST26) and returns to execute Act ST7 or ST8 to be in a standby state to wait for an input. At this time CPU 11 removes the displayed commodity name.

The CPU 11 carries out the commodity order data generation processing shown in Act ST9 every time a commodity code is input (ST8: Yes). That is, the CPU 11 reads the data of the commodity specified by the commodity code from the commodity database 7 and determines whether or not the order quantity N stored in the order quantity storage 23 satisfies a condition for the order of the commodity. Moreover, the CPU 11 associates the commodity code of the commodity with the order quantity N to generate commodity order data when the order quantity N satisfies the condition for the order of the commodity, and then stores the generated commodity order data in the order buffer 21.

Then, the CPU 11 considers there is an announcement on the termination of the continuous order mode if the release key on the keyboard 14 is pressed down. If there is an announcement on the termination of the continuous order mode (ST7: Yes), the CPU 11 determines whether or not commodity order data is stored in the order buffer 21 (ST10). Moreover, if commodity order data is stored (ST10: Yes), the CPU 11 gathers and files the commodity order data stored in the order buffer 21 and sends the commodity order data file to the local server via the wireless section 16 (ST11: order data output section). In this way, the wirelessly sent commodity order data file is sent to the local server via the wireless base station 5 and the router 4 to realize an order for the commodity.

Act ST11 is not executed if no commodity order data is stored in the order buffer 21 (ST10: No).

Then, the CPU 11 empties the order quantity storage 23 and removes the display of an order quantity (ST12). Moreover, the CPU 11 resets the continuous order flag F in the flag area 22 to be 0 (ST13) to release the continuous order mode.

Moreover, if the release key is pressed down when the CPU 11 is waiting for the input of an order quantity, then the CPU 11 executes Act ST 13. That is, the CPU 11 resets the continuous order flag F in the flag area 22 to be 0 (ST13) to release the continuous order mode.

In a shop installed with the shop system described in this embodiment, a shop assistant responsible for commodity ordering realizes a commodity ordering operation in a mall or warehouse with the ordering terminal 10 in the hand. In this case, if different commodities are repeatedly ordered in the same order quantity, the shop assistant first presses down the announcement key on the keyboard 14 to select a continuous order mode, and then inputs the shared order quantity of the commodities through the numeric keypad. Next, the shop assistant inputs, one by one, the commodity codes of the commodities ordered in the order quantity, and presses down the release key to release the continuous order mode after the commodity codes are successively input. Sequentially, each successively input commodity code is associated with the pre-input order quantity to generate commodity order data, which is then sent to the local server through a wireless communication to realize an order for the commodities.

As a result, instead of alternatively inputting a commodity identifier and an order quantity for each ordered commodity as described in the prior art, the input of an order quantity for each commodity is saved in this embodiment due to the use of the continuous order mode, thus, a commodity ordering service is simplified and the processing time is shortened. Besides, an error order quantity input is prevented.

Other embodiments are described below.

For example, in the embodiment above, in the continuous order mode, an order quantity N is input before the commodity codes of the commodities ordered in the order quantity, however, the following case is also applicable in which the commodity codes of the commodities ordered in the same order quantity are input before the order quantity and then the continuous order mode is released to generate commodity order data.

Moreover, it is necessary to input an order quantity in the embodiment above, however, the order quantity may be set by default to be, for example, 1 to save the input of the order quantity.

Further, in the embodiment above, a given key (release key) is set to release the continuous order mode, however, it may be set that any key on the operating keyboard 14 can be operated to release the continuous order mode to execute Acts ST10-ST13, which saves the setting of a release key.

Furthermore, in the case where no release key is needed, Acts ST10-ST12 may be executed when a number N is input from the numeric keypad, and then Act ST5 is executed. In such a manner, the input of the announcement key can be saved from the second continuous ordering processing for an order of commodities in a second order quantity, which is carried out after the first continuous ordering processing for an order of commodities in a first order quantity.

In addition, in the embodiment above, a control program for achieving the functions of the present invention is pre-installed in the ROM 12 configured in the apparatus. However, the present invention is not limited to this, the same program can also be downloaded to the apparatus from a network, or the same program recorded in a recording medium can also be installed in the apparatus. The form of the recording medium is not limited as long as the recording medium can store programs like a CD-ROM and a memory card and is readable to the apparatus. Further, the function achieved by an installed or downloaded program can also be achieved by the cooperation with an OS (Operating System) installed in the apparatus.

Although the present invention has been discussed with respect to several embodiments, these embodiments are merely illustrative but not restrictive of the present invention. The novel embodiments described herein may also be embodied in a variety of other forms; furthermore, various omissions, substitutions and modifications can be devised without departing from the scope of the present invention. The accompanying claims and their equivalents are intended to cover such forms and modifications as would fall within the scope and spirit of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An ordering apparatus, comprising:
 a processor that executes computer executable instructions comprising:
 an order quantity storing section configured to store an order quantity;
 an ordered commodity accepting section configured to accept input of a commodity identifier specifying an ordered commodity;

a termination determination section configured to determine termination of input acceptance of the commodity identifier; and an order data generation section configured to generate order data for each ordered commodity by associating a plurality of commodity identifiers which is accepted as input by the ordered commodity accepting section with order quantities stored in an order quantity storing section, during a period from a moment that the input of the commodity identifier is accepted to a moment that the termination determination section determines that input acceptance is terminated, wherein in response to an announcement key for a continuous order mode being input, the ordering apparatus accepts input of the order quantity;

in response to a number value being input through a numerical keypad, the ordering apparatus writes the number value into the order quantity storing section as the order quantity;

in response to the order quantity being written into the order quantity storing section, the ordering apparatus accepts input of a commodity identifier, and for each commodity identifier input, the ordering apparatus generates order data based on each commodity identifier and the order quantity in the order quantity storage section;

in response to a release key for releasing the continuous order mode being input or a number value being input through the numerical keypad, the ordering apparatus terminates acceptation of the input of the commodity identifier and outputs order data for each ordered commodity to an external device;

in response to acceptation of the input of the commodity identifier being terminated by input of a release key, the ordering apparatus releases the continuous order mode after the order data is output; and in response to acceptation of input of the commodity identifier being terminated by input of a number value being input through the numerical keypad, the ordering apparatus writes the number value into the order quantity storage section and resumes acceptation of input of the commodity identifier after the order data is output.

2. The ordering apparatus according to claim 1, further comprising:

an order quantity accepting section configured to accept additional input of the order quantity of the commodity; and an order quantity update section configured to update the order quantity stored in the order quantity storing section to the order quantity according to the additional input of which is accepted by the order quantity accepting section; wherein the acceptance of the additional input of the commodity identifier is started corresponding to the update of the commodity by the order quantity update section.

3. The ordering apparatus according to claim 1, further comprising:

a condition determination section configured to determine whether or not the order quantity stored in the order quantity storing section satisfies a condition of the order quantity that is set for each ordered commodity specified by the commodity identifiers accepted as input by the ordered commodity accepting section; wherein the order data of each ordered commodity is generated by the order data generation section when the condition is satisfied.

4. The ordering apparatus according to claim 2, further comprising:

a condition determination section configured to determine whether or not the order quantity stored in the order quantity storing section satisfies the condition of the order quantity that is set for each ordered commodity specified by the commodity identifiers accepted as input by the ordered commodity accepting section; wherein the order data of each ordered commodity is generated by the order data generation section when the condition is satisfied.

5. The ordering apparatus according to claim 3, wherein the condition is at least one of a maximum allowable order quantity and a minimum allowable order quantity at one time.

6. The ordering apparatus according to claim 4, wherein the condition is at least one of a maximum allowable order quantity and a minimum allowable order quantity at one time.

7. The ordering apparatus according to any one of claim 1, further comprising:

an order data output section configured to output the order data generated by the order data generation section for each ordered commodity in a lump into an external device.

8. The ordering apparatus according to claim 1, further comprising a display configured to display the order quantity, wherein the order quantity displayed on the display is changed to a number value input through a numerical keypad before acceptation of the input of the commodity identifier resumes.

9. An ordering method, comprising:

storing, by a system comprising a processor, an order quantity;

accepting, by the system, input of a commodity identifier specifying an ordered commodity;

determining, by the system, termination of the input acceptation of the commodity identifier; and generating, by the system, order data for each ordered commodity by associating a plurality of commodity identifiers accepted by a ordered commodity accepting section with the order quantities which is stored, during a period from a moment that the input of the commodity identifier is accepted to a moment that the input acceptation is terminated, wherein in response to a announcement key for a continuous order mode being input, accepting input of the order quantity;

in response to a number value being input through a numerical keypad, writing the number value into an order quantity storing section as the order quantity;

in response to the order quantity being written into the order quantity storing section, accepting input of a commodity identifier, and for each commodity identifier input, generating order data based on each commodity identifier and the order quantity in the order quantity storage section;

in response to a release key for releasing the continuous order mode being input or a number value being input through the numerical keypad, terminating acceptation of the input of the commodity identifier and outputting order data for each ordered commodity to an external device;

in response to acceptation of the input of the commodity identifier being terminated by input of a release key, releasing the continuous order mode after the order data is output; and in response to acceptation of input of the commodity identifier being terminated by input of a number value being input through the numerical keypad, writing the number value into the order quantity storage section and resuming acceptation of input of the commodity identifier after the order data is output.

* * * * *